H. C. ANDERSON.
TREATING GASEOUS FLUIDS.
APPLICATION FILED FEB. 8, 1912.
1,049,796.
Patented Jan. 7, 1913.
2 SHEETS—SHEET 1.
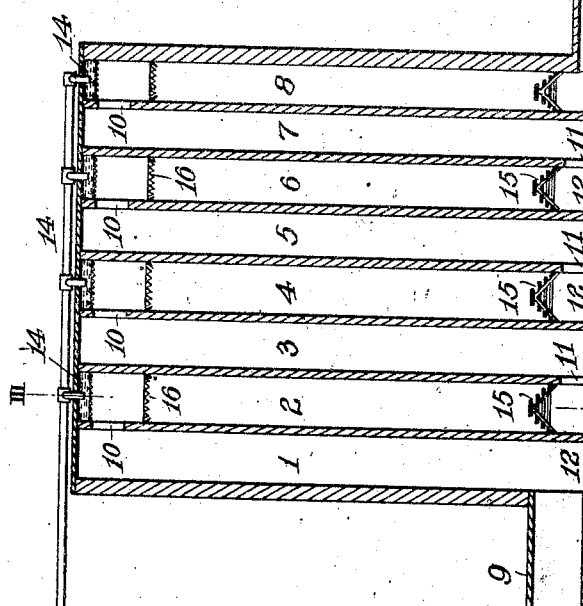
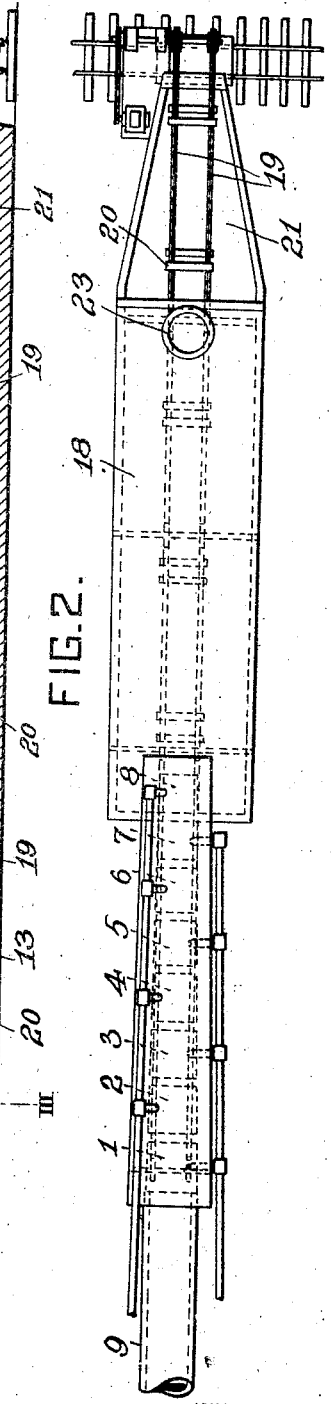

H. C. ANDERSON.
TREATING GASEOUS FLUIDS.
APPLICATION FILED FEB. 8, 1912.
1,049,796.
Patented Jan. 7, 1913.
2 SHEETS—SHEET 2.
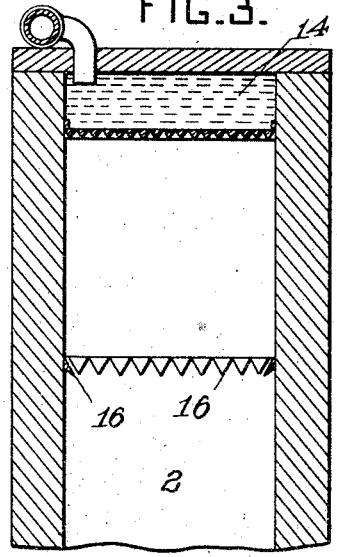
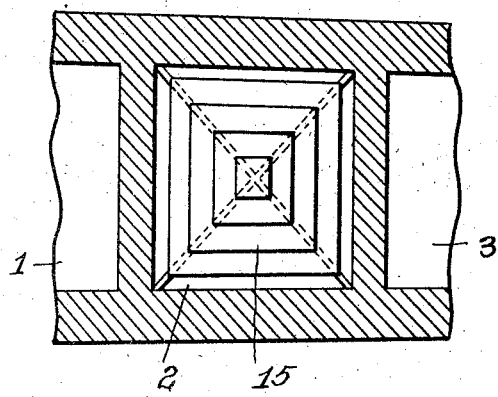
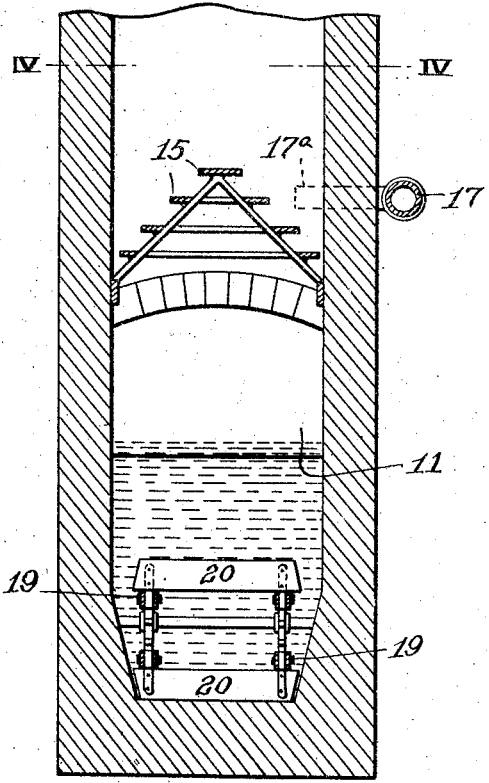
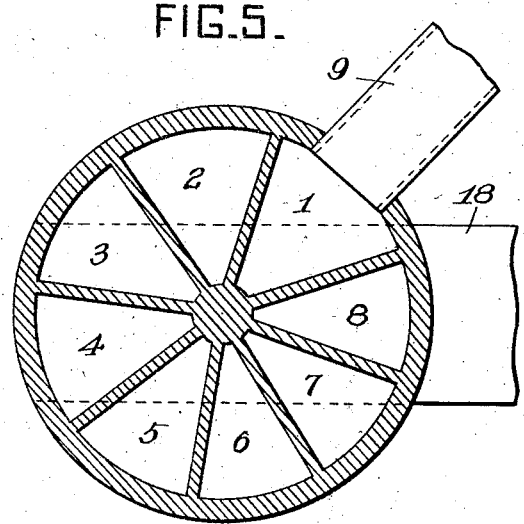
WITNESSES:
J. Herbert Bradley
Thomas Joyce
INVENTOR
Harry C. Andersen
by Darwin S. Wolcott Atty

UNITED STATES PATENT OFFICE.

HARRY C. ANDERSON, OF HAMPTON TOWNSHIP, ALLEGHENY COUNTY, PENNSYLVANIA.

TREATING GASEOUS FLUIDS.

1,049,796.   Specification of Letters Patent.   Patented Jan. 7, 1913.

Application filed February 8, 1912. Serial No. 676,405.

*To all whom it may concern:*

Be it known that I, HARRY C. ANDERSON, residing in Hampton township, in the county of Allegheny and State of Pennsylvania, a citizen of the United States, have invented or discovered certain new and useful Improvements in Treating Gaseous Fluids, of which improvements the following is a specification.

The invention described herein relates to the removal of dust from fluids and the condensation or elimination of deleterious gases, etc., and has for its object the production of a flow of the air, gases, etc., simultaneous with and through the agency of the means employed for the cooling and purifying of the air, gases, etc.

The invention is hereinafter more fully described and claimed.

In the accompanying drawings forming a part of this specification Figure 1 is a sectional elevation of my improved apparatus; Fig. 2 is a top plan view of the same; Fig. 3 is a sectional view on a plane indicated by the line III—III Fig. 1; Fig. 4 is a transverse section on a plane indicated by the line IV—IV Fig. 3; and Fig. 5 is a sectional plan view illustrating a modification in the arrangement of the flues or vertical passages in my improved apparatus.

While I have shown a form of apparatus especially adapted for treating gases from furnaces, roasters, etc., it is also adapted for other purposes as cleansing and cooling air for ventilation purposes.

The apparatus as shown is provided with a series of vertical flues or passages 1, 2, 3, etc., the number, length and transverse dimensions of which can be varied in accordance with the volume and condition of the gases, etc., to be treated. The gas or other fluid to be treated is introduced into the first flue 1 of the series by a flue or tube 9 leading from a roaster, furnace or other source preferably at a point adjacent to its lower end. This point of introduction is preferred when treating hot gases, etc., as advantage can be taken of their buoyancy to effect their initial movement, but it will be understood that the gases, etc., may be introduced at any desired point.

The uptake flue 1 is connected by an opening 10 to the downtake flue 2 adjacent to their upper ends, and the latter flue is connected by an opening 11 to the adjacent uptake flue 3, at or adjacent to their lower ends, and so on through the series. The flues are formed with open lower ends, but communication between the lower ends of the uptake flues and the succeeding down take flues is prevented. This sealing off of adjacent flues is effected in the construction shown herein by extending the walls 12 between said flues below the surface of the liquid in the basin 13 over which the flues are built. The upper ends of the uptake flues are closed, and in the downtake flues preferably at a point above the openings 10 through which the gas, etc., passes into the downtake flues, suitable means 14 are arranged for the introduction of a spray or rain-like flow of a liquid suitable for cleansing the gases, etc. This rain-like flow or spray should completely fill transversely the downtakes, so as to insure that the particles of liquid will operate collectively somewhat like a piston forcing the gases down through the flue. As will be readily understood by those skilled in the art, that what might be called an attenuated spray, *i. e.*, the drops or particles substantially separated, will not have any material influence in causing gases to move downwardly, but where the spray is dense filling the flue or passage and the drops or particles closely adjacent, such drops or particles will have what might be termed a frictional drive on the gases and the entire body will as stated operate somewhat like a piston and push the gases down.

As the spray or drops of liquid drop through the downtake flue, the frictional contact with the gases, etc., will cause the latter to move down in the same direction to the lower end of the downtake from which the gases, etc., will escape through the opening 11 into the uptake, while the liquid will drop into the basin 13. While the gases, etc., and the liquid are moving together the latter will wash out or mechanically remove the dust and any solids which may be mingled with the gases, etc., and deposit the same in the basin. As the liquid is cooler than the gases, etc., a condensation of the condensable portion of such gases will be effected.

While it is believed that the gases, etc., and liquid will be sufficiently intermingled while passing through the downtakes a more intimate mixing of the two may be effected by the arrangement of one or more shelves 15 in the downtake preferably adjacent to the lower ends of the latter, so that there will be a thorough intermingling of gases and liquid just before the complete separation of the gases and liquid, etc. due to the escape of the gases through opening 11 into the next uptake as stated.

In order to reduce the quantity of liquid flowing along the walls of the downtakes, said walls are provided with rows of projections 16 so constructed that any liquid lodging on the projections will flow inwardly to points on the undersides of the projections and will drop therefrom clear of the walls of the downtake.

The passage of the liquid which should fill the flue transversely through the downtakes, drawing with it the gases, etc., will reduce the pressure in the upper ends of the uptakes and downtakes thus inducing a more rapid flow through the uptakes and into the downtakes than would be due to the buoyancy of the gases, etc., and hence in the upper portions of the downtakes the flow of the gases, etc., will be more rapid than that of the liquid, the speed of which is accelerated and in the lower portion becomes greater than that of the air or gases. Hence during a large portion of the distance traversed by the gases, etc., and the water, there will be a rubbing as it were of one on the other, and as a consequence thereof a more effectual cleaning and condensing action on the gases.

As will be readily understood the gases, etc., are being constantly pulled from uptakes and the gases, etc., are being placed under more or less pressure in the lower ends of the downtakes, which pressure tends to push the gases, etc., up through the next succeeding uptake. From the foregoing it will be seen that gases in the uptakes are subjected to a pull toward the next succeeding downtake and to a push by the preceding downtake.

If desired steam or other fluid which will affect chemically or otherwise some or all the constituent elements of the gases from a furnace, etc., may be injected by means of the pipe 17 and nozzles 17ª preferably into the uptakes adjacent to their lower ends.

As before stated the flues 1, 2, etc., are built over a basin 13, in which is maintained sufficient liquid to seal the lower ends of the uptakes from the downtakes. Into this basin will fall the cleaning liquid carrying all dust or other solid materials collected from the gaseous fluids passing through the flues. A covered trough 18 extends a suitable distance from the basin, and an endless chain 19 provided with scrapers 20 is arranged in the trough and extends into the basin sufficiently far to enable the scrapers to remove all solid materials which have settled to the bottom of the basin. The trough is provided at its outer end with an inclined bottom portion 21 extending above the level of the liquid maintained in the trough. The endless chain and scrapers are so arranged in the trough that the scrapers will move the solid material up the inclined portion 21 and discharge over the end of the trough. The trough is made of such a depth that a passage 22 is formed between the surface of the water in the trough and the top of the latter, for the flow of uncondensable or unabsorbed gases from the last downtake to the outlet pipe 23. The outer end of the passage 22 is closed by a wall depending from the top of the trough and extending below the level of the liquid in said trough.

It is characteristic of my improvement that the cleansing and purifying of the air or gases, etc., is effected not only without any interference with the natural flow thereof, but that the movement of the fluid treated is due to a very large extent to such cleansing and purifying liquid, which practically fills the downtakes transversely and so operates on the entire volume of gas as to cause it to move downwardly with the liquid. And further this falling liquid effects a removal of the solids carried by the fluids, a condensation of portions of such fluids, and when suitable liquids are employed will absorb certain of the constituents of the gas. Hence my improvement while well adapted for other purposes is especially adapted for use in connection with the treatment of material as the roasting and reduction of ores in which deleterious gases, etc., are produced.

In Fig. 5 is shown a circular arrangement of the flues, which in some cases may be desirable where there is not sufficient room for an extended or tandem arrangement as shown in Fig. 1.

I claim herein as my invention:

1. The method herein described of causing gaseous fluids to traverse a series of alternating uptake and downtake flues, which consists in drawing the gaseous fluid from one uptake and forcing it into the lower end of another uptake by the action of a liquid in a finely divided condition falling through the downtake, the cross-sectional area of the falling liquid being approximately equal to the cross-sectional area of the downtake, whereby the falling liquid will have a propulsive action on the gaseous fluid.

2. In an apparatus for treating gaseous fluids, the combination of a series of vertically arranged flues, each flue connected to adjacent flues on opposite sides, and means for so discharging a liquid in a finely divided condition into the upper portions of alternate flues that such liquid will fill the downtake flues transversely.

3. In an apparatus for treating gaseous fluids, the combination of a series of uptake flues, a series of downtake flues alternating with the uptakes and connected at its upper portion to the preceding and at its lower portion to the succeeding uptakes, and a means for so supplying liquid in a finely divided condition to the upper portions of the downtakes that the flow of liquid will fill transversely the flues or downtakes.

In testimony whereof, I have hereunto set my hand.

HARRY C. ANDERSON.

Witnesses:
 ALICE A. TRILL,
 THOMAS JOYCE.